(12) United States Patent
Kline et al.

(10) Patent No.: US 6,912,839 B2
(45) Date of Patent: Jul. 5, 2005

(54) IGNITION SYSTEMS FOR HYBRID AND SOLID ROCKET MOTORS

(75) Inventors: Korey R. Kline, Miami, FL (US); Derek Dee Deville, Miami, FL (US)

(73) Assignee: Hy-Pat Corporation, Miami, FL (US)

( * ) Notice: Subject to any disclaimer, the term of this patent is extended or adjusted under 35 U.S.C. 154(b) by 0 days.

(21) Appl. No.: 10/269,366

(22) Filed: Oct. 11, 2002

(65) Prior Publication Data

US 2004/0068979 A1 Apr. 15, 2004

(51) Int. Cl.⁷ .............................. F02K 9/28; F02K 9/95
(52) U.S. Cl. ........................................ 60/251; 60/256
(58) Field of Search ........................... 60/251, 256, 257

(56) References Cited

U.S. PATENT DOCUMENTS

| 3,115,007 A | * | 12/1963 | Fox ............................. 60/251 |
| 3,332,353 A | * | 7/1967 | Burkhardt et al. ............. 60/256 |
| 3,334,489 A | * | 8/1967 | Vilet ............................ 60/251 |
| 5,582,001 A | * | 12/1996 | Bradford et al. .............. 60/251 |
| 5,715,675 A | * | 2/1998 | Smith et al. .................. 60/251 |
| 6,058,697 A | * | 5/2000 | Smith et al. .................. 60/251 |

* cited by examiner

Primary Examiner—Michael Koczo
(74) Attorney, Agent, or Firm—Gordon & Jacobson, PC

(57) ABSTRACT

An ignition system for a rocket motor includes a soft plastic tube that extends up into the combustion chamber and is coupled to an oxidizer source. Ignition source wires extend through the tube and terminate at a first end at a location which is set back from the end of the tube, and have a second end coupled to an electric power supply. In operation, an oxidizer is introduced into the tube simultaneously with activation of the power supply. The set back portion of the plastic tube becomes fuel for the oxidizer and is consumed, introducing a fire plume into the combustion chamber. The tube introduces additional fuel distinct from the fuel grain or propellant which is in contact with the both the ignition source wires and oxidizer. In addition, the tube will not damage the nozzle as it is being blown of the rocket during the main propulsion phase.

24 Claims, 6 Drawing Sheets

IGNITION SYSTEMS FOR HYBRID AND SOLID ROCKET MOTORS

BACKGROUND OF THE INVENTION

1. Field of the Invention

This invention relates broadly to rockets. More particularly, this invention relates to ignition systems for hybrid and solid rocket motors.

2. State of the Art

Rocket motors generally fall into three classes: solid propellant motors in which a solid fuel element undergoes combustion to produce thrust that propels the rocket, liquid propellant motors that accomplish the same function with a liquid fuel material, and hybrid rocket motors. Hybrid rocket motors may be characterized as a cross between a solid propellant motor and a liquid propellant motor. A hybrid motor generally uses a propellant consisting of a fluid oxidizer and a solid fuel element; however, they may use a combustible liquid fuel and a solid oxidizer.

Both solid rocket motors and hybrid rocket motors use an ignition system to initiate propellant combustion by creating a flame source in the combustion chamber of the rocket. The combustion chamber in a solid rocket motor houses the propellant, whereas in a hybrid rocket motor the combustion chamber typically houses solid fuel and the fluid oxidizer is fed into the chamber from a tank. Combustion of the solid or hybrid propellant generates thrust as the high pressure combustion products are discharged through the rocket nozzle.

Referring now to Prior Art FIG. 1, a prior art hybrid rocket 910 is shown. The rocket 910 generally includes a combustion chamber 912 provided with a solid fuel grain 914, a main oxidizer tank 916 adapted to feed an oxidizer 917, e.g., nitrous oxide, into the combustion chamber 912 through a valve 918, an aft nozzle 920, and a forward nose cone 922.

An ignition system 923 is provided for initiating combustion of the propellant. The ignition system 923 includes a rigid metal tube 924 axially extending into the combustion chamber 912. The tube 924 includes a longitudinal opening 926 and optionally a single set of one or more radial openings 928. The ignition system 923 also includes a outboard tank 930 dedicated to the ignition system, a tank valve 932, a regulator 934 and a low pressure solenoid valve 936. The tank 930 is provided with a pressurized fluid oxidizer 931, such as gaseous oxygen at 3000 psi. The tank valve 932 controls release of the oxidizer 931 from the tank 930. The regulator 934 controls the pressure of the oxidizer 931 after the oxidizer is released from the tank 930 and preferably drops the pressure down to approximately 100 psi. This lower pressure prevents the oxidizer 931 from "blowing out" the ignition flame, discussed below. The solenoid valve 936 controls release of the oxidizer 931 into the tube 924 and up into the combustion chamber 912. The ignition system 923 further includes two wires 938, 940 having exposed leads 942, 944 situated outside the tube 924, adjacent the openings 926, 928 of the tube 924 and near the forward bulkhead 946 of the rocket motor, as well as an ignition source, such as a neon sign transformer 948 capable or producing 10,000 V at 30 mA.

In operation, the tank valve 932 is opened and the solenoid valve 936 is actuated to allow the lower pressure oxidizer 931 to fill the chamber 912. Substantially simultaneously (e.g., within a few milliseconds), the transformer 948 is activated to create a high voltage arc across the leads 942, 944, which operates as the spark for ignition. The solid fuel grain 914 becomes the fuel source for ignition, as the lower pressure oxidizer 931 reacts with the exposed surface of the fuel grain 914. The lower pressure oxidizer is continually fed into the motor, preferably until the entire surface of the hybrid fuel grain is lit and the decision is made to open the main oxidizer tank valve 918 for the main propulsion phase. The arc causes the ignition oxidizer 931 to combust with the solid fuel grain 914 and thereby creates a flame. Such an ignition system is described in more detail in U.S. Pat. No. 5,715,675 which is hereby incorporated by reference herein in its entirety.

This type of ignition system has several shortcomings. First, in general, the hybrid fuel grain port is significantly larger in diameter, i.e., across 950, than the largest low pressure oxidizer tube that can be advanced up through the throat 952 of the nozzle 920. As a result, the ignition source and oxidizer are not in direct contact with the fuel grain. This creates an ignition delay while the spark "jumps the gap" toward the fuel grain. Second, the metal tube upon lift-off is blown out the nozzle. This forceful contact of the metal tube against the nozzle can result in damage to the nozzle and prevent successful operation of the rocket.

SUMMARY OF THE INVENTION

It is therefore an object of the invention to provide an ignition system which is not subject to delay.

It is another object of the invention to provide an ignition system which includes its own fuel source.

It is a further object of the invention to provide an ignition system which will not damage the nozzle.

It is an additional object of the invention to provide an ignition system that is adapted for quick and easy coupling with the rocket motor.

It is also an object of the invention to provide an ignition system that can be used with hybrid rocket motors as well as solid rocket motors.

In accord with these objects, which will be discussed in detail below, a rocket is provided with an ignition system that meets the above objectives. A preferred embodiment of the rocket is a hybrid rocket that generally includes a rocket motor having a combustion chamber provided with a solid fuel grain, and a main oxidizer tank adapted to feed an oxidizer under high pressure through a valve and into the combustion chamber. In accord with the invention, an ignition system is provided for the rocket that includes a plastic tube that extends up into the combustion chamber and terminates adjacent the bulkhead. The plastic tube is coupled to a relatively lower pressure fluid oxidizer source. In accord with a first embodiment of the ignition system, ignition source wires extend through a preferably soft plastic tube and terminate at a first end in contact with the tube at a location which is set back from the end of the tube. The wires have a second end coupled to an electric power supply. The ignition source wires are sized to permit the lower pressure oxidizer to flow around the wires and through the tube.

In operation, the lower pressure oxidizer is introduced into the tube substantially simultaneously with activation of the electric power supply of the ignition system. The set back portion of the plastic tube becomes fuel for the oxidizer and is consumed, introducing a large hot plume and some unburned oxidizer into the combustion chamber. As such, the tube introduces additional fuel distinct from the fuel grain which is in contact with the both the ignition source wires and oxidizer. This eliminates the ignition delay of the prior art during which the oxidizer searches for fuel. Moreover, the soft plastic tube will not damage the nozzle as it is being blown of the rocket during the main propulsion phase.

In accord with a second embodiment of the invention, the function of the plastic tube is carried out by two tubes: a plastic first tube provided with the ignition source wires and adapted to feed a relatively lower pressure, lower flow rate of oxidizer toward the bulk head, with the ignition source wires set back from the end the first tube, and a metal or plastic second tube adapted to feed a relatively higher pressure, higher flow rate of oxidizer into the combustion chamber. The second tube preferably terminates lower than the first tube. The tubes are preferably concentric, with the second tube surrounding the first tube, but may alternatively extend adjacent one another. Also in accord with the second embodiment, a distribution block with metered orifices is used to feed a single high pressure oxidizer source at respective desired pressures and flow rates into the first and second tubes.

The second embodiment allows the combustion chamber to be rapidly filled with oxidizer through the higher pressure, higher flow rate tube without concern that such a high flow rate will blow out the flame plume at the ignition source in the second tube.

In accord with another aspect of the invention, in either embodiment of the invention, the ignition source wires can be integrally formed with, i.e., co-extruded with the tube or tubes. At the end of the tube, the plastic may be stripped from about the wires, and the wires can then be bent and inserted into the tube to the desired set back location. Moreover, with respect to the second embodiment, a single multilumen extruded plastic tube can be used, with one lumen for lower pressure, lower flow rate oxidizer and the ignition source wires, and another lumen for higher pressure, higher flow rate oxidizer.

The ignition system can also be used with solid rocket motors to provide the same benefits as described above with respect to hybrid rocket motors.

Additional objects and advantages of the invention will become apparent to those skilled in the art upon reference to the detailed description taken in conjunction with the provided figures.

BRIEF DESCRIPTION OF THE DRAWINGS

Prior art

DETAILED DESCRIPTION OF THE PREFERRED EMBODIMENTS

Figure 1:
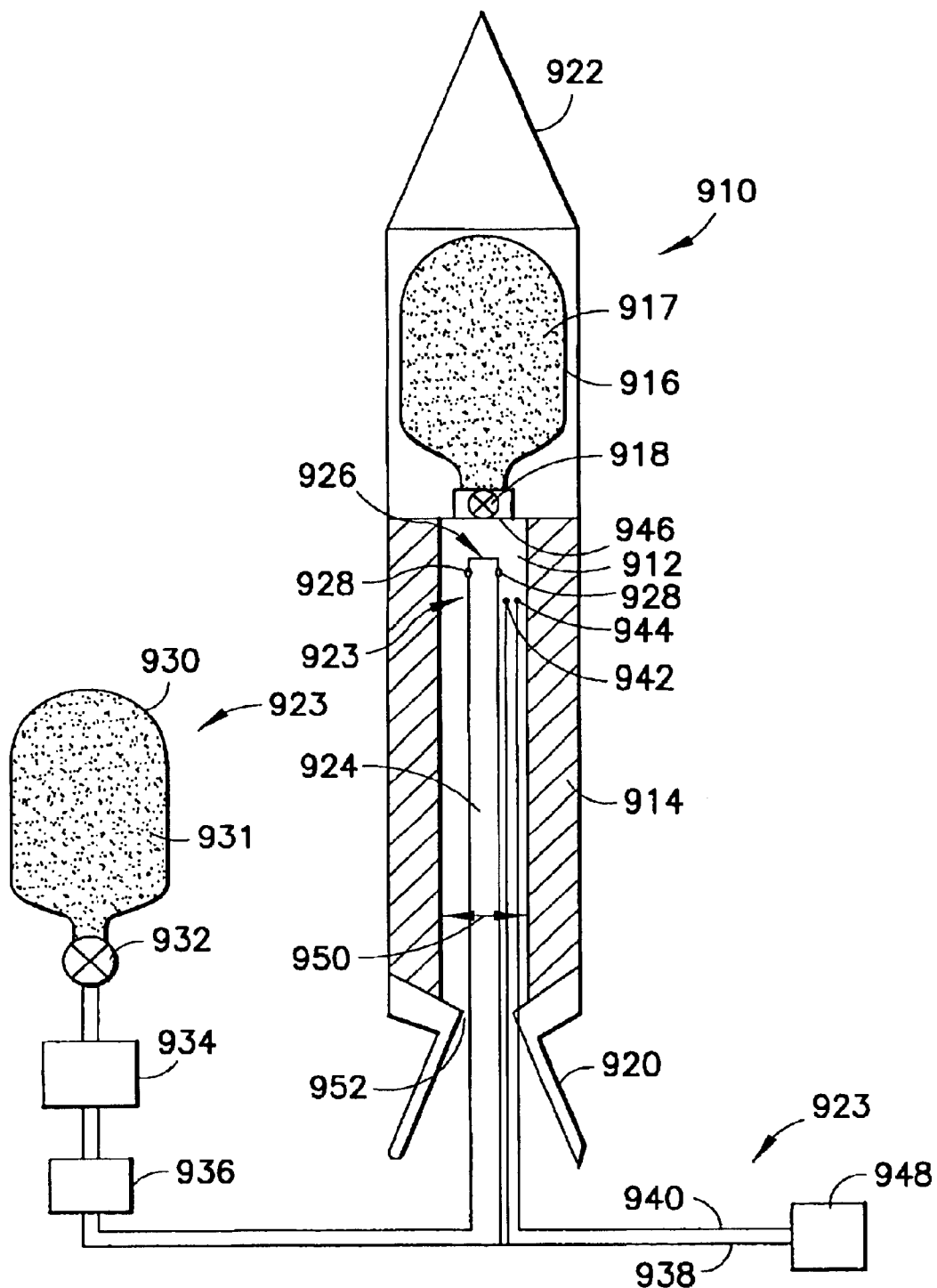
FIG. 1 is a schematic of a hybrid rocket and a prior art ignition system.
Figure 2:
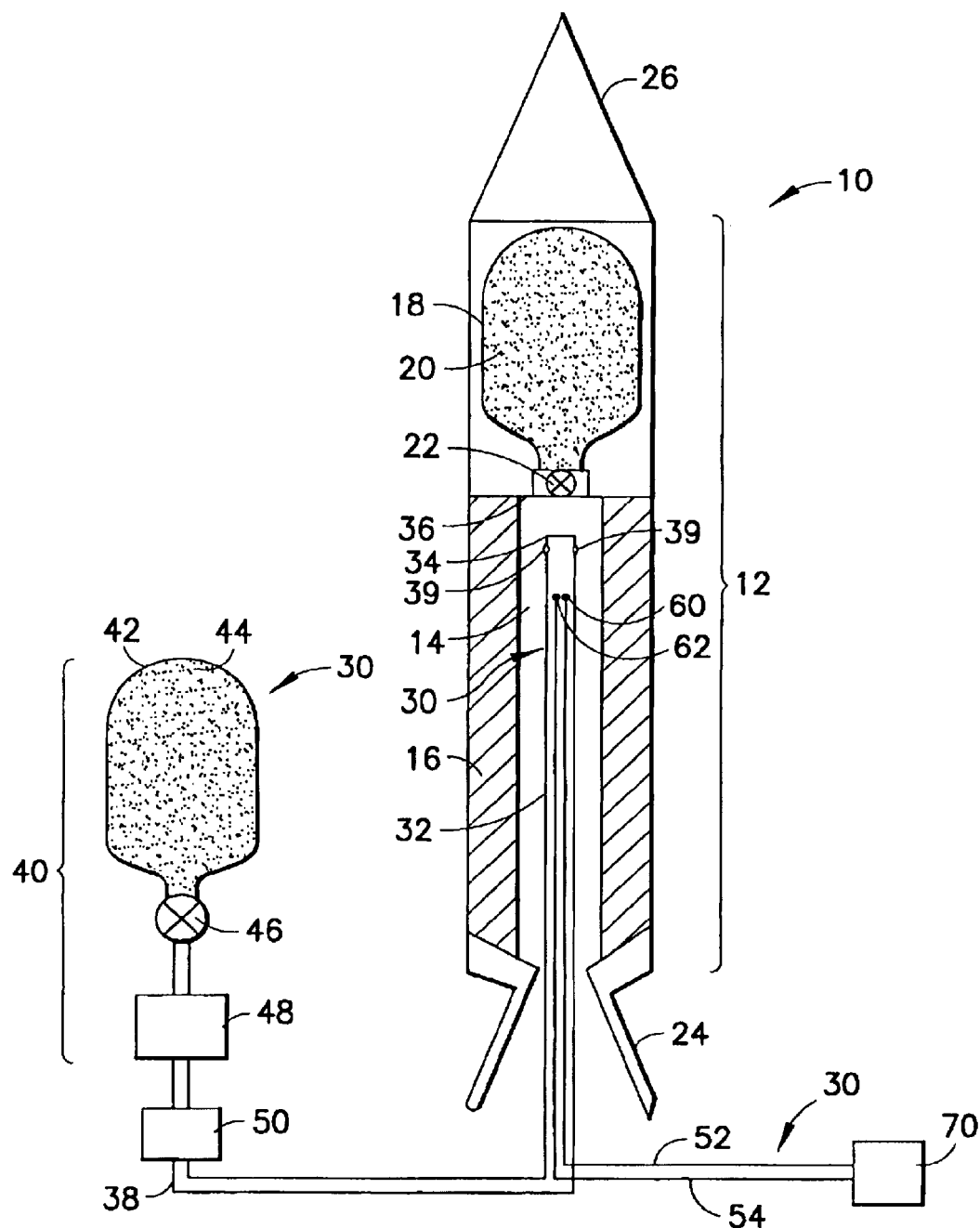
FIG. 2 is a schematic view of a hybrid rocket and an ignition system according to a first embodiment of the invention.

Turning now to FIG. 2, a hybrid rocket 10 is shown. The hybrid rocket 10 includes a rocket motor 12 having a combustion chamber 14 provided with a solid fuel grain 16 and a main engine oxidizer tank 18 adapted to feed an oxidizer 20 under high pressure into the combustion chamber 14. Suitable solid fuel grain 16 includes HTPB (hydroxyl-terminated polybutadiene), optionally including one or more of aluminum, magnesium, carbon or other fuel additives, ABS resin, CTPB, PBAN and other fuel/binder systems known in the art. The oxidizer 20 is preferably nitrous oxide ($NO_2$), but can be any other self-pressurizing oxidizing agent such as gaseous oxygen, fluorine, or carbon dioxide ($CO_2$). Alternatively, the oxidizer can be a non-self-pressurizing oxidizer at relatively low pressure, such as liquid oxygen (LOX), nitrogen tetroxide (NTO), red fuming nitric acid (RFNA), or hydrogen peroxide ($H_2O_2$) combined with a pressurant at high pressure, such as helium or nitrogen. As yet another alternative, oxidizer 20 can be fed into the combustion chamber 14 via a pump, such as a turbopump. A valve 22 is provided to control the flow of the main engine oxidizer 20 into the combustion chamber 14. The rocket 10 also includes an aft nozzle 24, as well as a nose cone 26 which is preferably adapted to carry a payload.

In accord with the invention, an ignition system 30 is provided for the rocket 10 that includes a preferably soft and flexible plastic tube 32. The plastic tube 32 is preferably made of polyethylene, polypropylene, ABS, nylon, or any other extruded plastic that burns. The tube 32 extends up into the combustion chamber 14 and terminates at one end 34 adjacent a bulkhead 36 in the combustion chamber. Radial holes 39 may be provided adjacent the end 34 of the tube (to aid in directing the below described flame plume toward the fuel grain 16). An inlet 38 of the plastic tube 24 is coupled to a relatively low pressure fluid oxidizer source 40. More particularly, the low pressure fluid oxidizer source 40 includes an oxidizer tank 42 containing gaseous oxygen 44 or another oxidizer, a valve 46 on the tank 42 to control release of the oxygen, and a pressure regulator 48. The oxygen 44 is preferably pressurized at approximately 3000 psi in the tank 42, and the regulator 48 drops the pressure, preferably to approximately 20 psi. A solenoid valve 50 is provided between the oxygen source 40 and the inlet 38 of the tube 32, and operates to control release of the pressure-regulated oxygen into the tube 32.

Figure 3:
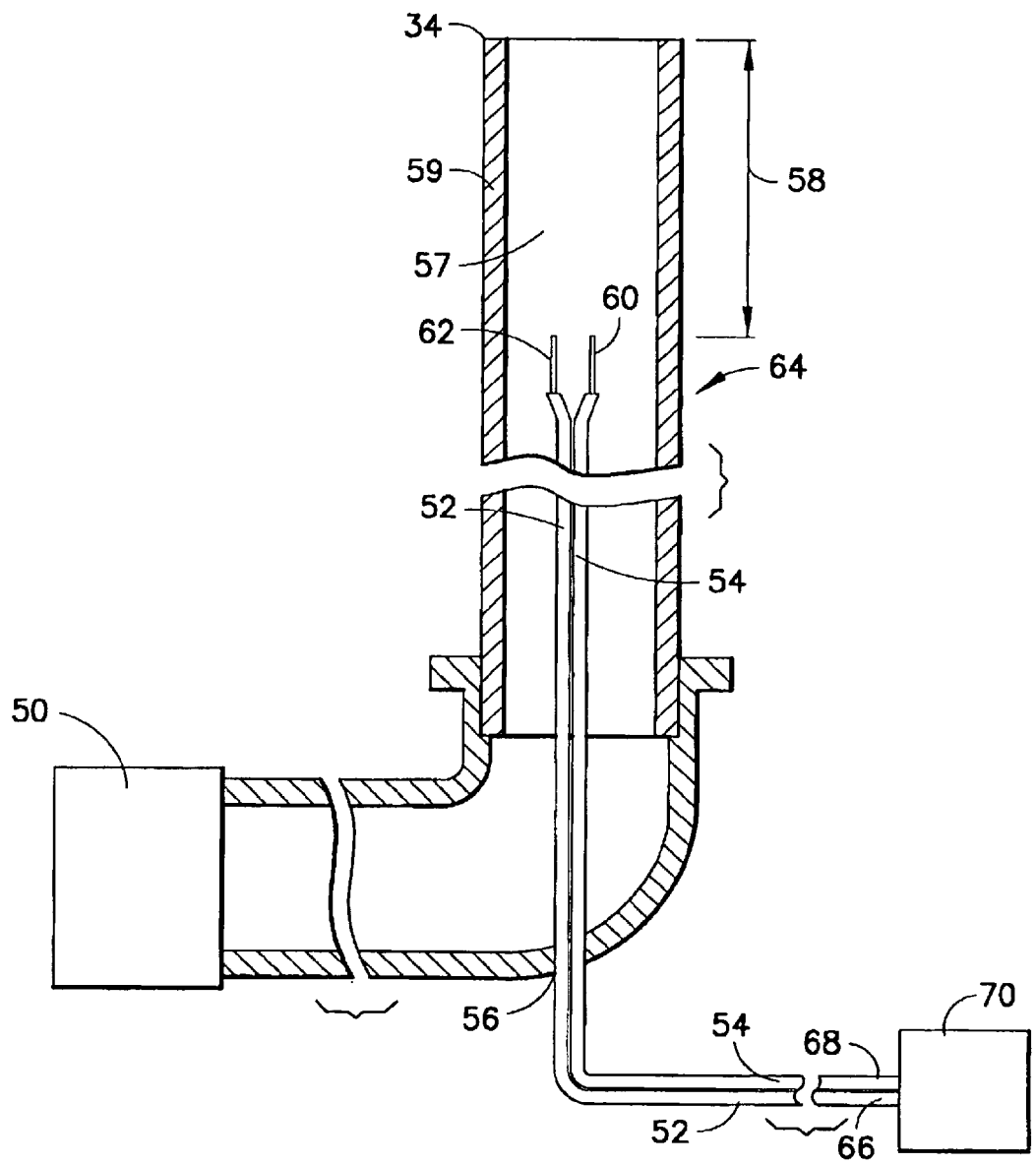
FIG. 3 is a schematic detail view of a tube and ignition source according to the first embodiment of the ignition system.

Referring to FIGS. 2 and 3, the ignition system 30 also includes insulated ignition source wires 52, 54 that extend through a side wall opening 56 in the plastic tube 32 to a location 57 which is set back a distance 58 from the end 34 of the tube 32. By way of example only, for a tube 32 having a diameter of one-quarter inch, the set back distance is preferably approximately three inches. Ignition ends 60, 62 of the wires 52, 54 are stripped of insulation and preferably contact the inner wall 64 of the tube 32. The opposite ends 66, 68 of the wires are coupled to an ignition source such as a high voltage power supply 70, e.g., a neon sign transformer capable of producing 10,000 V at 30 mA. The ignition source wires 52, 54 are sized to permit the regulated low pressure oxygen 44 to flow around the wires and completely through the tube 32.

In operation, the oxygen 44, reduced in pressure by the regulator 48, is introduced into the tube 32 by activation of the solenoid valve 50. This causes the oxygen 44 to pass through the tube 42 and exit into and fill the combustion chamber 14. Substantially simultaneously, the electric power supply 70 of the ignition system 30 is activated causing an ignition spark (e.g., an arc) across the wires. In response to the ignition spark, the set back portion 59 of the plastic tube 32 becomes fuel for the oxygen 44 and is consumed, introducing a large hot plume and some unburned oxygen 44 into the combustion chamber 14. As such, the tube 32 introduces additional fuel, distinct from the fuel grain 16, which is in contact with the both the ignition source wires 60, 62 and the oxygen 44. This provides relatively immediate ignition of the rocket motor, as the oxygen is not required to seek out a fuel source, such as the fuel grain 16, to initiate combustion. Moreover; the soft plastic tube 32 will not damage the nozzle 24 as it is being blown out of the rocket during the main propulsion phase. However, if a high flow rate of the low pressure oxygen is used to quickly fill the chamber to facilitate ignition (as may be required in relatively larger rockets having combustion chambers of a substantial volume), it is possible for the flow of oxygen to blow out the flame at the ignition source. Therefore, the flow rate of the oxygen and its effect on the ignition system is preferably monitored.

Figure 4:
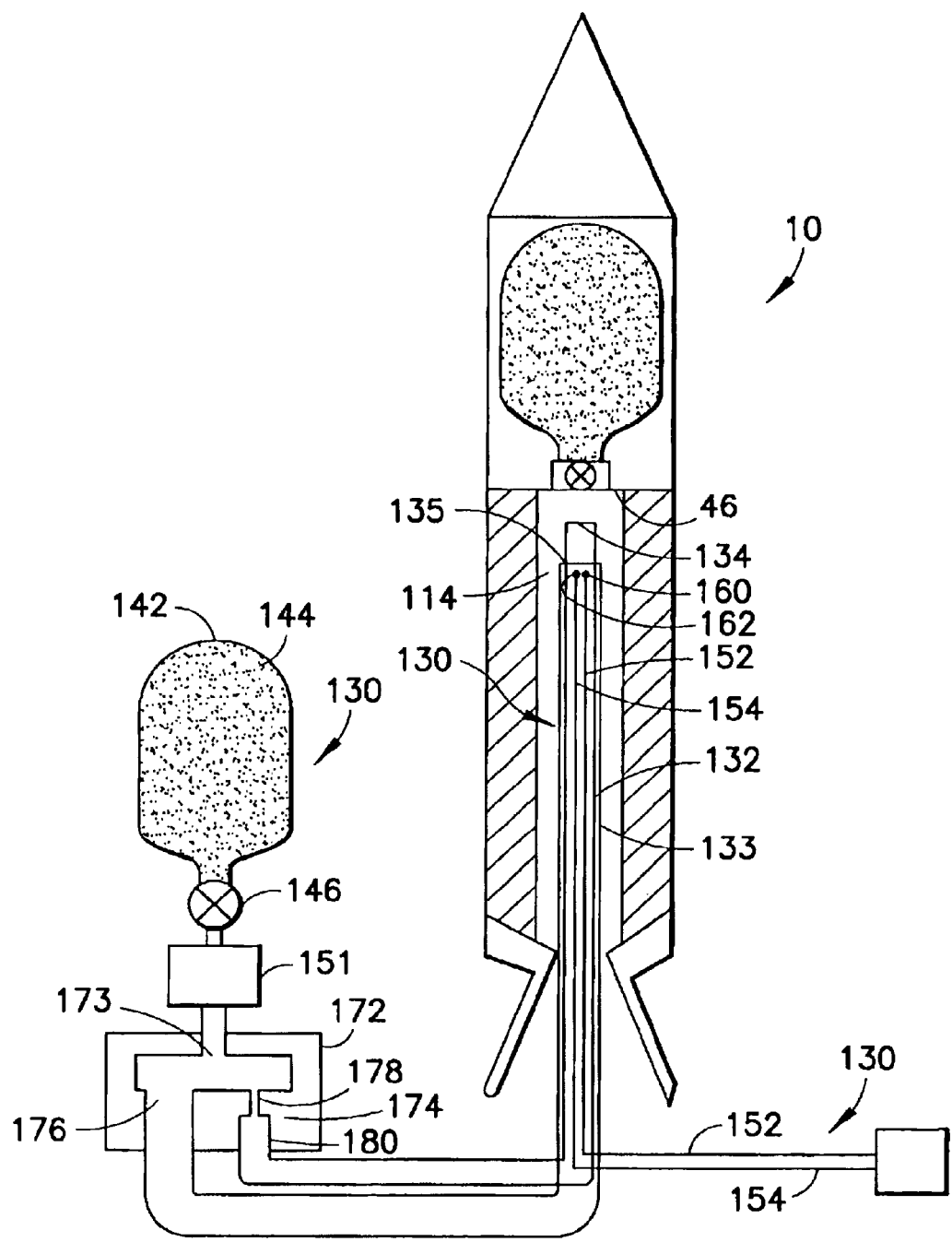
FIG. 4 is a schematic view of a hybrid rocket and an ignition system according to a second embodiment of the invention.
Figure 5:
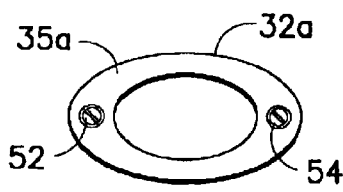
FIG. 5 is a sectional view of a first co-extrusion of a single lumen plastic tube and ignition source wires of the ignition system of the invention according to the invention.
Figure 6:
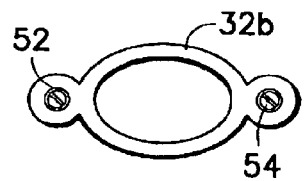
FIG. 6 is a sectional view of a second co-extrusion of a single lumen plastic tube and ignition source wires of the ignition system of the invention according to the invention.

Referring now to FIG. 4, a second embodiment of an ignition system 130 of the invention (where reference numerals incremented by one hundred correspond to similar elements in the first embodiment) is shown. In accord with the second embodiment, the function of the plastic tube 32 in the first embodiment is carried out by two tubes: a plastic first tube 132, and second tube 133 preferably also constructed of plastic, but alternatively constructed of metal or another generally non-consumable material. The second tube 134 preferably is provided concentrically about the first tube 132, but alternatively may run adjacent thereto in a preferably parallel orientation. By way of example, the first tube is preferably approximately one-quarter inch in diameter, and the second tube is preferably approximately one inch in diameter.

More particularly, the oxygen tank 142 is provided with a valve 146 that is coupled to a high pressure solenoid valve 151 which controls the flow of oxygen 144 exiting the valve 146 to a distribution block 172. The distribution block 172 includes an inlet 173 and first and second metered orifices 174, 176. The first orifice 174 includes a constricted portion 178 and an expanded portion 180. The first tube 132 is coupled to the first orifice 174 at the expanded portion 180, with the constricted portion 178 operating to reduce the flow rate of oxygen into the tube 132, and the expanded portion 180 operating to reduce the pressure of the low flow rate oxygen 144. The second tube 133 is coupled to the second orifice 176 to receive relatively higher pressure, higher flow rate oxygen 144. Both tubes 132, 133 extend up into the combustion chamber, with the first tube 132 being provided with ignition source wires 152, 154 that terminate at a set back distance from the end 134 of the tube 132, as described above with respect to the first embodiment. The second tube 133 has an end 135 that preferably terminates below the end 134 of the first tube, but preferably above the ends 160, 162 of the wires 152, 154.

In operation, during ignition, relatively lower pressure and lower flow rate oxygen travels up the plastic first tube 132 and consumes the plastic as fuel, creating a flame plume that exits the end 134 of the first tube. Simultaneously, the higher pressure and higher flow rate oxygen travels up the second tube 133 and rapidly fills the combustion chamber 114 with oxygen, without concern for blowing out the flame plume created within and by the first tube 132. In addition, the distribution block 172 eliminates the needs for multiple pressure regulators, which substantially reduces both weight and cost for the system. Moreover, the orifices in the distribution block 174, 176 can be adjusted in size to tailor the ignition sequence.

Figure 7:
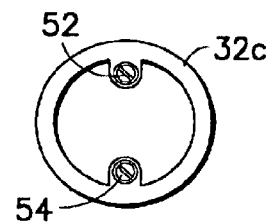
FIG. 7 is a sectional view of a third co-extrusion of a single lumen plastic tube and ignition source wires of the ignition system of the invention according to the invention.
Figure 8:
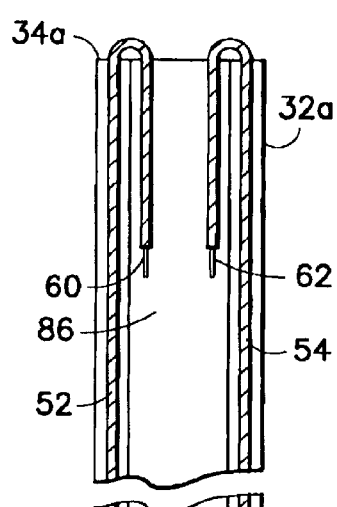
FIG. 8 is a schematic broken longitudinal section of a portion of the ignition system of the invention utilizing a co-extrusion of the plastic tube and ignition source wires.
Figure 8:
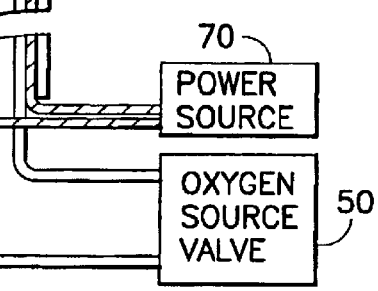

Turning now to FIGS. 5 through 10, in accord with a preferred aspect of the invention, suitable for use with either the first or second embodiments, the tube or tubes and wires can be integrated in a co-extrusion. That is, with reference to the first embodiment and FIGS. 5 through 7, the tube 32 and wires 52, 54 can be a co-extrusion in which the wires are encapsulated in the plastic extrusion of the tube. The wires 52, 54 can be encapsulated within the regular wall 35a of the tube 32a (FIG. 5), or in a manner peripheral to the tube 32b (FIG. 6), or along the interior of the tube 32c (FIG. 7). Referring to FIG. 8, end portions of the wires 53, 54 are separated from the end 34a of the tube and the tube is cut back. The ends 60, 62 of the wires 52, 54 are stripped of insulation, and then bent back approximately 180° and inserted into the central lumen 86 of the tube 32. The other ends of the wire are coupled to the power source 70, and the lower end of the tubing is coupled to the valve 50 controlling release of the preferably low flow oxygen. The ignition system can then be operated as described above. This integrated tube and wire co-extrusion permits a single roll of ignition tubing to be cut to length for any rocket motor with minimal assembly time and effort.

Figure 9:
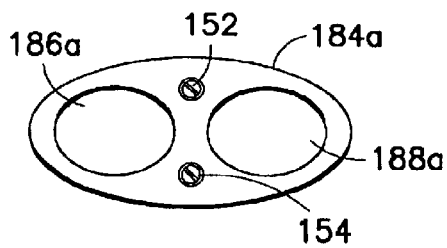
FIG. 9 is a sectional view of a first co-extrusion of a dual lumen plastic tube and ignition source wires of the ignition system of the invention according to the invention.
Figure 10:
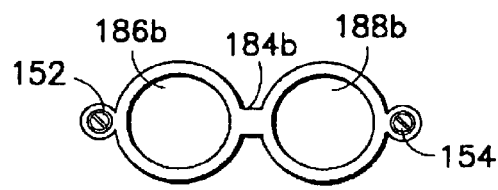
FIG. 10 is a sectional view of a second co-extrusion of a dual lumen plastic tube and ignition source wires of the ignition system of the invention according to the invention.

Likewise, with reference to the second embodiment and FIGS. 9 and 10, the first and second tubes 132, 133 and wires 152, 154 can also be combined into a single integrated co-extrusion 184a and used as described above with respect to the first embodiment. For example, co-extrusion 184a encapsulates wires 152, 154 within the wall of the extrusion and defines multiple lumens 186a, 188a for respective oxygen flows (FIG. 9). By way of another example, co-extrusion 184b encapsulates the wires 152, 154 about the periphery of the lumens 186b, 188b (FIG. 10). Other configurations of the co-extrusions are also possible and within the scope of the ignition system of the invention.

Figure 11:
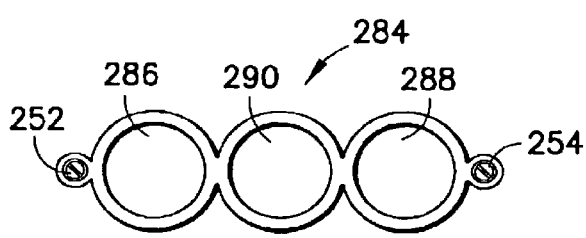
FIG. 11 is a sectional view of a co-extrusion of a tri-lumen plastic tube and ignition source wires of the ignition system of the invention according to the invention.

Turning now to FIG. 11, a tri-lumen tube 284 with encapsulated wires 252, 254 may be used in a system in which it is desired to externally supply into the main oxidizer tank and/or externally pressurize the main motor oxidizer 20 until launch (FIG. 2). The tube 284 includes a first lumen 286 for low pressure ignition oxygen, a second lumen 288 for high pressure combustion chamber oxygen fill, and a third lumen 290 for the main motor oxidizer. A rocket in which the main motor oxidizer is supplied through a tube until launch is described in detail in previously incorporated U.S. Pat. No. 5,715,675.

Figure 12:
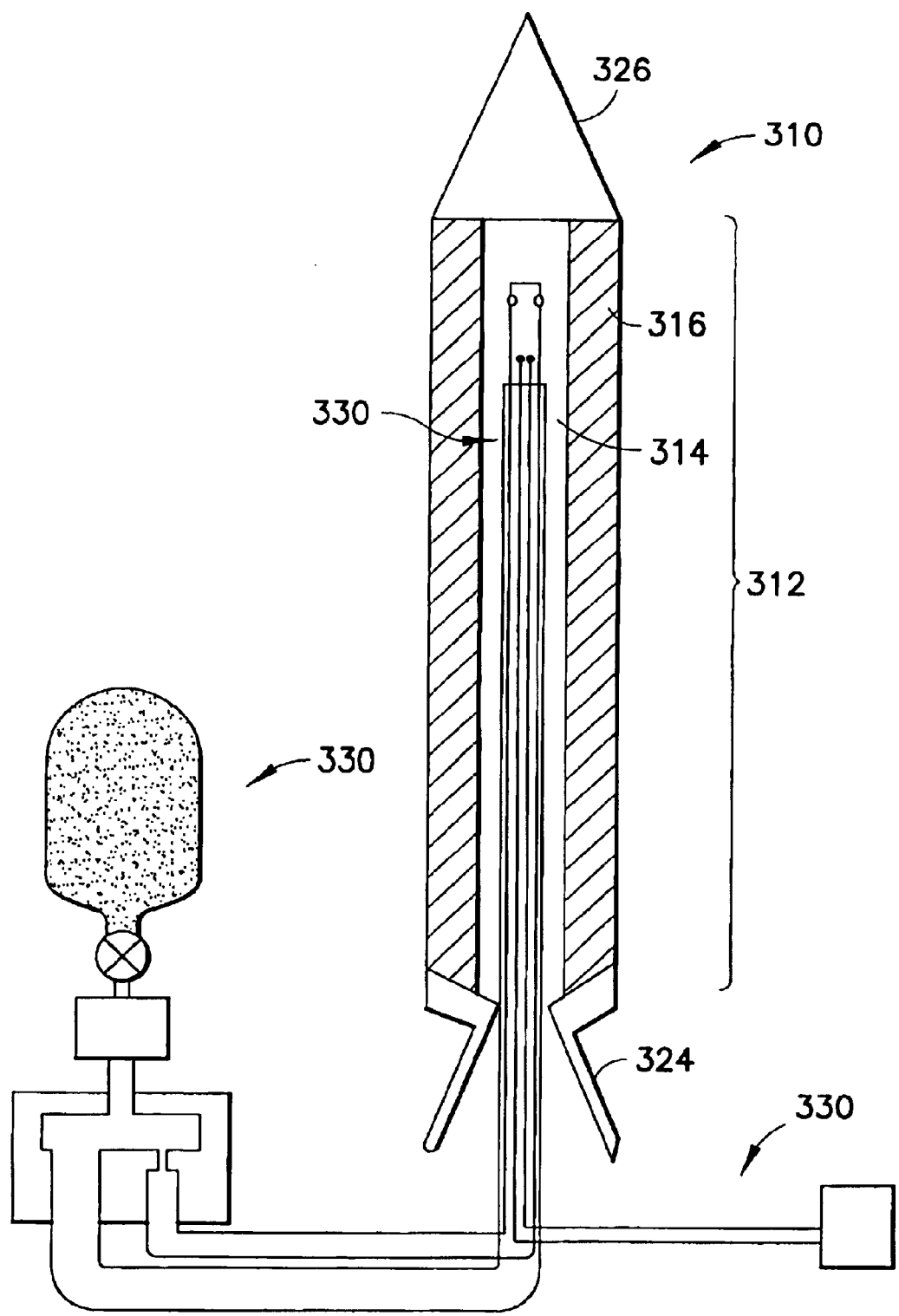
FIG. 12 is a schematic view of a solid propellant rocket provided with an ignition system according to the invention.

Turning now to FIG. 12, the ignition system of the invention can also be used with solid rocket motors. FIG. 12 shows a rocket 310 having a rocket motor 312 includes a combustion chamber 314 provided with solid propellant 316, such as ammonium perchlorate-HTPB-aluminum. The rocket 310 also includes an aft nozzle 324, as well as a nose cone 326 which is preferably adapted to carry a payload. The ignition system 330 shown is substantially as provided with respect to the second embodiment, however the ignition of the first embodiment may alternatively be used. The ignition system functions as previously described such that, upon activation, a flame plume is created which impinges on the solid propellant and initiates combustion of the solid propellant 316 in the combustion chamber 314.

There have been described and illustrated herein several embodiments of an ignition system for both hybrid and solid rocket motors. While particular embodiments of the invention have been described, it is not intended that the invention be limited thereto, as it is intended that the invention be as broad in scope as the art will allow and that the specification be read likewise. Thus, while the ignition system has been described with respect to a rocket, it is appreciated that the system of the invention can be used in missiles and other projectiles, and all are intended to be encompassed by the term "rocket". In addition, while a spark gap connected to a neon sign transformer has been disclosed as an ignition source, it is recognized that other such sources may be used. For example, an electric match can be used, with or without pyrodex. By way of another example, an ignition spark created by a wad of steel wool, shorted and connected to a 24V DC power supply can also be used. Moreover, while a distribution block has been described as receiving a fluid oxidizer from a common source and supplying the fluid oxygen at two different flow rates and/or pressures to two different tubes, it is recognized that the same may be accomplished by using multiple pressure regulators and/or multiple sources of fluid oxidizer. Also, while particular oxidizers, fuels, and propellants have been disclosed, it is appreciated that any suitable oxidizer and fuel combination for hybrid rocket motors and any suitable propellant for solid rocket motors can be used. It will therefore be appreciated by those skilled in the art that yet other modifications could be made to the provided invention without deviating from its spirit and scope as claimed.

What is claimed is:

1. An ignition system for a rocket motor, comprising:
   a) a plastic first tube having a first end and a second end;
   b) a pair of wires discrete from said first tube and having first and second ends, said pair of wires extending into said first tube and said first ends of said wires terminating near said first end of said first tube;
   c) a power supply coupled to said second ends of said wires; and
   d) a first fluid oxidizer source which supplies an oxidizer to said second end of said first tube.

2. An ignition system according to claim 1, wherein:
   said first ends of said wires are set back from said first end of said first tube and thereby define a set back portion of said first tube between said first ends of said wires and said first end of said first tube,
   wherein when said first tube is being supplied with said oxidizer and said power supply is activated, said oxidizer consumes at least some of said set back portion of said first tube as fuel.

3. An ignition system according to claim 1, wherein:
   said pair of wires extend into said tube through a hole in a sidewall of said first tube.

4. An ignition system according to claim 1, wherein:
   said power supply, when activated, causes an arc to be produced across said first ends of said wires.

5. An ignition system according to claim 1, wherein:
   said first fluid oxidizer source includes
   i) a fluid oxidizer under relatively high pressure,
   ii) a pressure regulator adapted to lower said pressure of said fluid oxidizer, and
   iii) a valve which controls release of the relatively lower pressure fluid oxidizer into said second end of said first tube.

6. An ignition system according to claim 1, wherein:
   said first tube is relatively flexible.

7. An ignition system according to claim 1, wherein:
   said first tube is made of one of polyethylene, polypropylene, ABS, and nylon.

8. An ignition system according to claim 1, wherein:
   said fluid oxidizer is gaseous oxygen.

9. An ignition system for a rocket motor, comprising:
   a) a plastic first tube having an inner wall, a first end and a second end;
   b) a pair of wires having first and second ends, said first ends of said wires terminating near said first end of said first tube, wherein at least one of said first ends of said wires is in contact with said inner wall;
   c) a power supply coupled to said second ends of said wires; and
   d) a first fluid oxidizer source which supplies an oxidizer to said second end of said first tube.

10. An ignition system for a rocket motor, comprising:
    a) a plastic first tube having an inner wall, a first end and a second end;
    b) a pair of wires having first and second ends, said first ends of said wires terminating near said first end of said first tube, wherein said first tube and said wires are integrated in a plastic co-extrusion;
    c) a power supply coupled to said second ends of said wires; and
    d) a first fluid oxidizer source which supplies an oxidizer to said second end of said first tube.

11. An ignition system according to claim 10, wherein:
    said first ends of said wires are stripped of said plastic co-extrusion, and configured bent into said first tube through said first end of said first tube.

12. An ignition system for a rocket motor, comprising:
    a) a plastic first tube having a first end and a second end;
    b) a pair of wires having first and second ends, said first ends of said wires terminating near said first end of said first tube;
    c) a power supply coupled to said second ends of said wires;
    d) a first fluid oxidizer source which supplies an oxidizer to said second end of said first tube;
    e) a second tube having first and second ends; and
    f) a second fluid oxidizer source,
       wherein said first fluid oxidizer source supplies an oxidizer at a first flow rate into said second end of said first tube, and
       wherein said second fluid oxidizer source supplies an oxidizer at a second flow rate into said second end of said second tube, said second flow rate being greater than said first flow rate.

13. An ignition system according to claim 12, wherein:
    said second tube is provided concentrically about said first tube.

14. An ignition system according to claim 12, wherein:
said first ends of said first and second tubes are longitudinally displaced.

15. An ignition system according to claim 12, further comprising:
g) a distribution means for distributing a common source of fluid oxidizer to said first and second fluid oxidizer sources.

16. An ignition system according to claim 12, wherein;
said first tube, said second tube, and said wires are integrated in a co-extrusion.

17. An ignition system according to claim 12, wherein:
said first and second tubes are defined by two lumens of a single plastic extrusion.

18. An ignition system for a rocket motor, comprising:
a) a first tube having a first end and a second end;
b) a second tube having first and second ends;
c) a pair of wires having first and second ends, said first ends of said wires terminating near said first end of said first tube;
d) a power supply coupled to said second ends of said wires;
e) a first fluid oxidizer source which supplies an oxidizer to said second end of said first tube; and
f) a second fluid oxidizer source which supplies an oxidizer to said second end of said second tube,
wherein said first fluid oxidizer source supplies said oxidizer at a first flow rate into said second end of said first tube, and
wherein said second fluid oxidizer source supplies said oxidizer at a second flow rate into said second end of said second tube, said second flow rate being greater than said first flow rate.

19. A rocket, comprising:
a) a rocket motor having a combustion chamber; and
b) an ignition system for said rocket motor,
said ignition system including,
i) a plastic first tube having a first end and a second end, said first end extending into said combustion chamber,
ii) a pair of wires discrete from said first tube and extending into said first tube, said pair of wires having first and second ends, said first ends of said wires terminating near said first end of said first tube,
iii) a power supply coupled to said second ends of said wires and adapted to create an ignition spark across said first ends of said wires, and
iv) a first fluid oxidizer source which supplies an oxidizer to said second end of said first tube.

20. A rocket according to claim 19, wherein:
said rocket motor is a hybrid rocket motor.

21. A rocket according to claim 19, wherein:
said rocket motor is a solid rocket motor.

22. A rocket according to claim 19, wherein:
said first ends of said wires are set back from said first end of said first tube and thereby define a set back portion of said first tube between said first ends of said wires and said first end of said first tube,
wherein when said first tube is being supplied with said oxidizer and said power supply is activated, said oxidizer consumes at least some of said set back portion of said first tube as fuel.

23. A rocket, comprising:
a) a rocket motor having a combustion chamber; and
b) an ignition system for said rocket motor,
said ignition system including,
i) a plastic first tube having a first end and a second end, said first end extending into said combustion chamber,
ii) a pair of wires having first and second ends, said first ends of said wires terminating near said first end of said first tube, wherein said first tube and said wires are integrated in a plastic co-extrusion,
iii) a power supply coupled to said second ends of said wires and adapted to create an ignition spark across said first ends of said wires, and
iv) a first fluid oxidizer source which supplies an oxidizer to said second end of said first tube.

24. A rocket, comprising:
a) a rocket motor having a combustion chamber; and
b) an ignition system for said rocket motor,
said ignition system including,
a plastic first tube having a first end and a second end, said first end extending into said combustion chamber,
ii) a pair of wires having first and second ends, said first ends of said wires terminating near said first end of said first tube,
iii) a power supply coupled to said second ends of said wires and adapted to create an ignition spark across said first ends of said wires,
iv) a first fluid oxidizer source which supplies an oxidizer to said second end of said first tube,
v) a second tube having first and second ends, said first end extending into said combustion chamber, and
vi) a second fluid oxidizer source,
wherein said first fluid oxidizer source supplies an oxidizer at a first flow rate into said second end of said first tube, and
wherein said second fluid oxidizer source supplies an oxidizer at a second flow rate into said second end of said second tube, said second flow rate being greater than said first flow rate such that said oxidizer supplied into said second tube relatively rapidly fills said combustion chamber and said oxidizer supplied into said first tube is adapted to consume said plastic of said first tube when said power source creates an ignition spark across said first ends of said wires.

* * * * *